United States Patent [19]

Graham

[11] 3,782,017

[45] Jan. 1, 1974

[54] COLLAR IDENTIFICATION TAG

[76] Inventor: Granville Y. Graham, 7212 Richland Dr., Lynchburg, Va. 24502

[22] Filed: Nov. 11, 1971

[21] Appl. No.: 197,722

[52] U.S. Cl. .................................................. 40/303
[51] Int. Cl. ............................................... G09f 3/16
[58] Field of Search..................... 40/300, 301, 302, 40/303, 304, 21 C; 117/12; 119/106

[56] References Cited
UNITED STATES PATENTS

| 440,306 | 11/1890 | Durning | 40/303 |
| 1,407,239 | 2/1922 | Weiss | 281/1 |
| 2,680,315 | 6/1954 | McHugh et al. | 40/303 |
| 2,890,534 | 6/1959 | Quayle | 40/303 |
| 3,034,430 | 5/1962 | Bradford | 101/369 |
| 272,036 | 2/1883 | Fassitt | 40/303 |
| 1,657,250 | 1/1928 | Fetters | 119/106 |
| 2,139,377 | 12/1938 | Mull et al. | 40/125 A X |
| 3,360,877 | 1/1968 | Estep | 40/300 |
| 2,772,630 | 12/1956 | Share | 117/12 X |
| 2,778,790 | 1/1957 | Sobol | 117/12 X |
| 3,340,630 | 9/1967 | Becker | 40/21 C |
| 655,197 | 8/1900 | Cobean | 40/303 |
| 1,803,196 | 4/1931 | Mader | 40/303 |

FOREIGN PATENTS OR APPLICATIONS

| 11,491 | 1903 | Great Britain | 40/303 |

Primary Examiner—Wm. H. Grieb
Attorney—B. Franklin Griffin, Jr. et al.

[57] ABSTRACT

An animal identification tag is described herein comprising a main body, for attaching the identification tag to a collar, and a porous indicia-receiving coating material, for receiving and displaying a marking material. In one embodiment, the main body is formed of a soft aluminum and has protruding tabs which can be wrapped around a collar. In another embodiment, the main body is permanently attached to a collar by rivets, or the like. Both paint and tape are disclosed as indicia-receiving coating materials. In the case of an indicia receiving paint a primer paint is applied between the main body and the paint.

8 Claims, 6 Drawing Figures

PATENTED JAN 1 1974
3,782,017
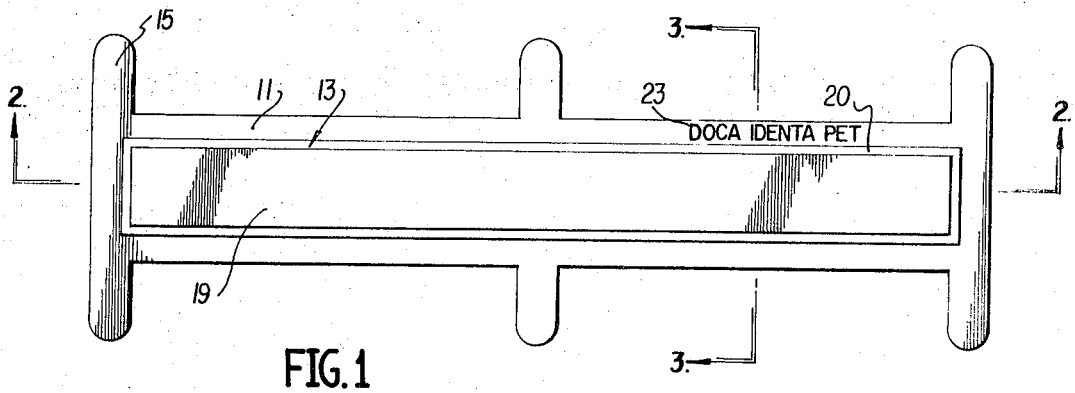
FIG. 1
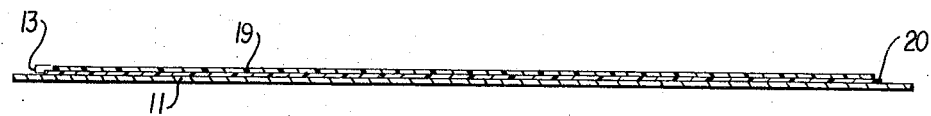
FIG. 2
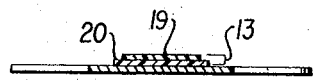
FIG. 3
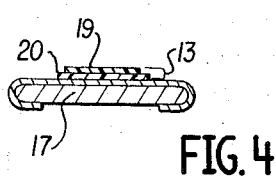
FIG. 4
FIG. 5
FIG. 6
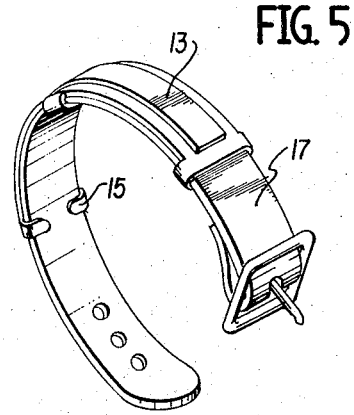
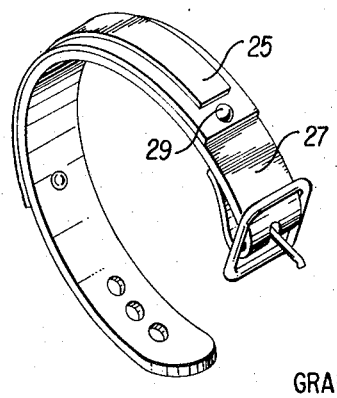
INVENTOR
GRANVILLE Y. GRAHAM
BY Griffin, Branigan & Kindness
ATTORNEYS 3,782,017

COLLAR IDENTIFICATION TAG

BACKGROUND OF THE INVENTION

This invention relates generally to the art of animal identification tags and more particularly to the art of collar mountable identification tags.

The desirability of attaching identifying tags to pets, such as dogs and cats, is generally recognized.

Some existing pet identification tags are lastingly attached — such as by rivets — to permanent — usually leather — collars (see U.S. Pat. No. 1,803,196 to Mader). However, many pet owners, especially those of cats, do not acquire permanent type collars for their pets and, therefore, do not attach identification tags to their pets.

Thus, it is an object of this invention to provide a pet identification tag which can be easily and inexpensively attached to pets even though such pets do not wear permanent type collars.

Further, one type of prior-art pet identification tags comprises a metallic plate that is marked by a relatively expensive process, such as by engraving (See U.S. Pat. No. 1,803,196 to Mader). A difficulty with such a tag is that it is somewhat troublesome and expensive for a pet owner to have the tag engraved.

It is also an object of this invention to provide a pet identification tag which receives, and displays, identifying markings, but yet must not be marked by an unduly expensive process.

At least one prior art identifying device comprises a metallic clamp which can be used to detachably hold a metallic name plate to a collar (see U.S. Pat. No. 655,197 to Cobean). An advantage of such a device is that it can be attached, and detached, from widely-used three-month flea collars; although such use is not taught by Cobean. However, this device suffers in that the name plate is a separate member from the clamp, and may therefore become separated from the clamp and a collar to which the clamp is attached. Also, as mentioned above, it is normally expensive to mark metallic plates.

It is therefore still another object of this invention to provide an identification tag which can be readily attached and detached from collars, but which comprises a single, structurally-integrated member which can be inexpensively marked.

SUMMARY OF THE INVENTION

In accordance with the principles of this invention, an animal identification tag comprises a main body for attaching the tag to a collar and a porous, indicia-receiving coating material, for receiving and displaying, a marking material. In one embodiment, the main body is formed of soft aluminum and has protruding tabs which can be wrapped around a collar. In another embodiment, the main body is permanently attached to a collar by rivets. Both paint and tape are disclosed as indicia-receiving materials. In the case of an indicia-receiving paint a primer paint is applied between the main body and the paint.

BRIEF DESCRIPTION OF THE DRAWINGS

The foregoing and other objects, features and advantages of the invention will be apparent from the following more particular description of embodiments of the invention, as illustrated in the accompanying drawings in which reference characters refer to the same parts throughout the different views. The drawings are not necessarily to scale, emphasis instead being placed upon illustrating the principles of the invention in a clear manner.

FIG. 1 is a top plane view of an identification tag employing principles of this invention;

FIG. 2 is a sectional view taken along line 2—2 in FIG. 1;

FIG. 3 is a sectional view taken along line 3—3 in FIG. 1;

FIG. 4 is a sectional view of an identification tag employing principles of this invention mounted on a collar-like structure;

FIG. 5 is an isometric view of an identification tag employing principles of this invention detachably mounted on a collar-like structure; and, FIG. 6 is an isometric view of an identification tag employing principles of this invention riveted to a collar-like structure.

DESCRIPTION OF A PREFERRED EMBODIMENT

Referring to FIGS. 1-5 there is shown an embodiment of an identification tag employing principles of this invention having a main body 11 and an indicia receiving strip 13.

The main body 11 is formed of a 1/16 inch soft aluminum sheet. In this regard, a more brittle aluminum — for example aluminum that is commonly used in aircraft — is not as desirable as soft aluminum because it does not have the desired pliantness. This pliantness aids in mounting the main body 11 on a collar, as is described below.

The main body comprises a rectangular plate having mounting protrusions 15 extending therefrom. As can be seen in FIG. 5 the mounting protrusions 15 are used for attaching the identification tag to collar-like structures. The mounting protrusions 15 are simply bent around a collar-like structure 17 as shown in FIG. 5. Because the main body 11 is pliant, it can be easily molded to conform to the collar-like structure 17.

The indicia receiving strip 13 comprises a coating material 19 and an attaching material 20. In one embodiment the coating material 19 is a porous paint. It is desirable that such paint be sufficiently pliant to withstand flaking off of the main body 11, and that it be sufficiently porous to receive, and hold, marking materials. An example of such a paint is a Sherwin Williams graphic arts finish sold under the trademark "SHER-WILL-GLO" and having the following composition:

| | |
|---|---|
| Pigment by Weight | 34% |
| Vehicle by Weight | 66% |
| | 100% |
| Composition of Pigment by Weight: | |
| Sulfonamide-amide-aldehyde Resin Containing Less than 3% Fluorescent Dye (Lead Free) | 100% |
| Composition of Vehicle by Weight: | |
| Acrylic Polymer | 48% |
| Varnish | 25% |
| Aromatic Hydrocarbons | 24% |
| Mineral Spirits | 3% |
| | 100% |
| Composition of Acrylic Polymer by Weight: | |
| Non-Volatile | |
| Acrylic Resin | 40% |
| Volatile | |
| Aromatic Hydrocarbons | 60% |
| | 100% |

| Composition of Varnish by Weight: | |
|---|---|
| Non-Volatile | |
|   Linoleic, Oleic, Linolenic, Fatty Acid Alkyd Resin | 60% |
| Volatile | |
|   Mineral Spirits | 40% |
| | 100% |

Although this paint is mentioned as an example of a suitable paint for forming the coating material 19, there are believed to be other materials that are also suitable. The attaching material 20 is a primer paint such as vinyl white coating. The primer paint 20 functions to lastingly join the paint 19 to the main body 11 and to increase the brilliance of coating material 19. Again the primer should be somewhat pliant.

In another embodiment of the invention the coating material 19 is a strip of tape, rather than paint, and the attaching material 20 is adhesive, rather than a primer paint. In this embodiment, a suitable material for the coating material 19 is a frangible layer of porous pigmented, writing ink and graphite receptive material as described in U.S. Pat. No. 3.034,430 to Bradford.

If it is desired, permanent markings 23, such as trade designations, can be made on the metallic main body 11 during manufacture thereof by lithographic or other printing processes.

In operation, the identification tag shown in FIGS. 1-5 is attached to a collar-like structure 17 by means of mounting protrusions 15 and identifying markings are made on the coating material 19 by means of a hand-marking instrument, such as a pencil or a pen. In this regard, experimentation indicates that a permanent, or indelible, type ink serves quite well as a marking medium.

The advantage of the identification tag shown in FIGS. 1-5 are immediately apparent to those familiar with the problems of pet ownership. The identification tag is readily attachable and detachable to and from collars and, therefore, is especially useful with flea collars which are normally changed approximately every 3 months. This feature is especially desirable because flea collars are widely used both for cats and dogs. An equally desirable feature of the above described tag is that identifying indicia can be made thereon by pet owners with readily available coating instruments, such as pens and pencils. This is in sharp contrast with most pet identification tags which must be engraved or marked by other expensive processes. Further, the identification tag of this invention is relatively inexpensive to manufacture, and can therefore be sold at a relatively modest price.

Another embodiment of this invention is shown in FIG. 6 wherein an identification tag 25 is shown riveted to a collar-like structure 27. The identification tag 25 is similar to the identification tag shown in FIGS. 1-5 in all respects with the exception that it does not have the mounting protrusions 15 but rather is mounted to a collar-like structure 27 by means of rivets 29. The FIG. 6 embodiment is not easily detached from collars, but it is intended for use on "throw-away" collars, such as flea collars, where detachability is not of such significance. For example, it can be riveted to a flea collar and sold with the flea collar as a unit. A buyer thereof can place identification markings on the indicia receiving strip using a pen or pencil. Such a product is economical because it is not necessary for buyers to use expensive printing processes to place identifying markings thereon. Also, the tag itself is relatively inexpensive and does not add a great deal to the total cost of a flea collar.

While the invention has been particularly shown and described with reference to preferred embodiments, it will be understood that various changes in form and detail may be made therein without departing from the spirit and scope of the invention. For example, the indicia-receiving strip 13 may cover the whole of one side of the main body 11; such that, in manufacturing a plurality of identification tags, a sheet of aluminum may be covered by an indicia receiving paint or tape, and the tags thereafter stamped out of the covered sheet. Further, in practice the tags disclosed herein could be sold in a package along with a pen containing indelible ink.

The embodiments of the invention in which an exclusive property or privilege are claimed are described as follows:

1. An identification tag of the type used to attach identifying indicia to an animal collar, said collar having a bottomside which is normally to be held against the neck of an animal, a top side which is normally to be facing away from the neck of said animal, and a longitudinal axis, said identification tag comprising:
    a main body made up of a flat elongated single piece of material which has a width not greater than the approximate width of said collar to which said main body is to be attached, said main body having a longitudinal axis, a top side and a bottom side;
    said main body including an attaching means unitary and integral therewith for selectively attaching and detaching said main body to and from said collar so that said main body's longitudinal axis is approximately parallel to the longitudinal axis of said collar and said bottom side of said main body is held against the top side of said collar; and
    a porous indicia receiving paint for adhering to, and coating, a portion of said top side of main body, said porous indicia receiving paint being receptive to writing ink dispensed from ordinary writing pens and capable of thereafter indelibly displaying indicia caused by such ink reception.

2. An identification tag as claimed in claim 1 wherein said main body, including said attaching means, is made of a pliant material.

3. An identification tag as claimed in claim 2 wherein said pliant material is a soft aluminum.

4. An identification tag as claimed in claim 2 wherein said attaching means comprises at least one pair of protruding tabs integral with said main body, with members of said at least one pair extending outwardly, in opposite directions, from said main body.

5. An identification tag as claimed in claim 4 wherein there are at least three pairs of tabs positioned longitudinally along said main body.

6. An identification tag as claimed in claim 1 wherein the composition of said paint is substantially as follows:

| Overall Composition by Weight: | | |
|---|---|---|
| Pigment | Approximately | 34% |
| Vehicle | Approximately | 66% |
| | | 100% |
| Composition of Vehicle by Weight: | | |
| Acrylic Polymer | Approximately | 48% |
| Varnish | Approximately | 25% |
| Aromatic Hydrocarbons | Approximately | 24% |
| Mineral Spirits | Approximately | 3% |
| | | 100% |
| Composition of Acrylic Polymers by Weight: | | |
| Non-volatile | | |
|   Acrylic Resin | Approximately | 40% |
| Volatile | | |
|   Aromatic Hydrocarbons | Approximately | 60% |
| | | 100% |

Composition of Varnish by Weight:
Non-volatile
  Linoleic, Oleic, Linolenic,
  Fatty Acid Alkyd Resin      Approximately  60%
Volatile
  Mineral Spirits             Approximately  40%
                                            100%

7. An identification collar comprising:

an animal collar having a bottom side which is normally to be held against the neck of an animal, a top side which is normally to be facing away from the neck of said animal, and a longitudinal axis;

a main body made up of a flat, elongated, single piece of material which has a width not greater than the approximate width of said collar to which said main body is to be attached, said main body having a longitudinal axis, a top side, and a bottom side;

an attaching means for permanently attaching said main body to said collar so that said main body's longitudinal axis is parallel to the longitudinal axis of said collar and said bottom side of said main body is held against said top side of said collar; and a porous indicia receiving paint for adhering to, and coating, a portion of said top side of said main body, said porous indicia receiving paint being receptive to writing ink dispensed from ordinary writing pens and capable of thereafter indelibly displaying indicia caused by such ink reception.

8. An identification collar as claimed in claim 7 wherein is further included an adhesive material which aids in adhering said porous indicia receiving coating to said main body.

* * * * *